Aug. 28, 1956  L. O. GREELEY  2,760,285
ROAD MACHINERY

Filed March 13, 1953  2 Sheets-Sheet 1

INVENTOR
LEO O. GREELEY
BY
*Peter P. Price*
ATTORNEY.

INVENTOR
LEO O. GREELEY

United States Patent Office 2,760,285
Patented Aug. 28, 1956

2,760,285
ROAD MACHINERY

Leo O. Greeley, Cadillac, Mich., assignor to F. J. McCarthy Company, Cadillac, Mich., a corporation of Michigan Application March 13, 1953, Serial No. 342,237

6 Claims. (Cl. 37—155)

This invention relates to road grading equipment and more particularly to the blade actuating unit for a road scraper designed to be mounted on the underframe of a highway maintenance truck.

Although there is available a considerable variety of earth grading and levelling equipment specifically designed for that purpose and generally limited to such use, it is economically desirable to utilize equipment adapted to convert a truck into a grader whereby the equipment may serve multiple purposes. Such equipment provides in a single unit a grader, a truck and snow removal facilities. The most expensive portion of the equipment, the truck, is common to all three uses.

Equipment designed to adapt trucks for road scraping and maintenance has been manufactured and in general use for many years. This equipment, however, has had one particularly serious drawback. It is essential that the moldboard be pivoted for vertical movement so that it may be raised or lowered. It is conventional practice to accomplish this movement of the blade either by pnuematic or hydraulic means, normally the latter. Heretofore, the blade was raised and lowered by a cylinder mounted near the end of the scraper frame which, upon extension lowered the blade and upon retraction raised the blade. These cylinders stood above the scraper frame and extended above the running board and frame structure of the truck. This resulted in interference with the truck body. Because of this interference, the operating angle of the blade was restricted. In some truck models, it was necessary to remove a portion of the truck's running board to provide even minimum operating clearance for these cylinders.

My invention overcomes this difficulty by providing a road scraper attachment for a truck in which the blade raising and lowering mechanism has a low silhouette no part of which extends above the frame of the scraper equipment. Thus, no conflict occurs between the truck and the scraper.

The actuating mechanism for the blade must develop sufficient force to positively hold the heavy blade in raised position. At the same time it must be capable of holding the lowered blade against the surface with sufficient force to prevent jumping or chatter as it moves over the surface striking objects of varying resistance. At the same time allowance must be made to relieve the blade when it strikes something offering a particularly high resistance. Because of the nature of its use, this equipment must be simply and ruggedly constructed to provide dependable service under adverse operating conditions.

My invention accomplishes each of these purposes with a simple, novel structure of compact and rugged design. These and other objects and purposes of my invention will be immediately seen by those acquainted with the design and construction of highway maintenance equipment upon reading the following specification and the accompanying drawings.

Figure 1:
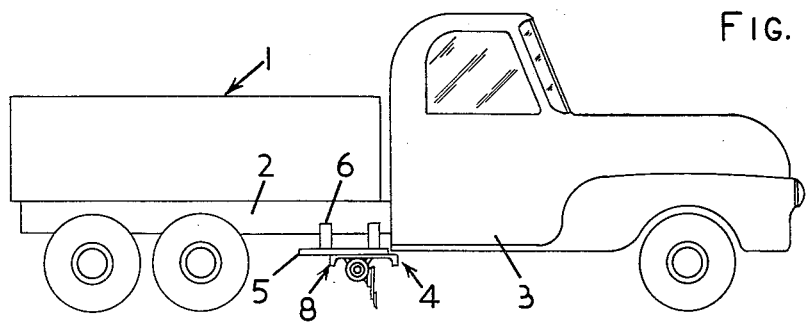
Fig. 1 is a side view of a truck equipped with my improved road scraper conversion unit.

In executing the objects and purposes of my invention, I have provided a frame designed to be mounted to and beneath the main frame of a truck. A main beam is pivotally mounted to this frame for rotation about a vertical axis. Mounted beneath the beam are three hydraulic torque motors each having a central rotor designed to rotate in either of two directions under the influence of pressurized, hydraulic fluid. The scraper blade is mounted by suitable means to each end of each of the rotors whereby rotation of the rotors of the hydraulic torque motors will effect raising and lowering of the scraper blade. The torque motors have a silhouette confined entirely to the area below the beam, eliminating all interference with the frame of the truck.

The numeral 1 indicates a truck having a main frame 2, running boards and cab structure 3. The scraper unit 4 is mounted beneath the main frame 2 of the truck between the rear and front wheels.

The supporting frame 5 for the scraper blade may be of any conventional construction and is provided with means 6 for rigidly securing it to the truck frame 2. The mounting frame 5 is not described in detail since it forms no part of my invention. Existing scraper units may be converted, utilizing the existing support frame 5. The supporting frame 5 permits the scraper assembly 8 to be pivoted about a vertical axis for assuming an angle adapted to transport the material being scraped. This rotation may be effected by any suitable means either manual or automatic. My invention is incorporated in the scraper assembly 8.

Figure 2:
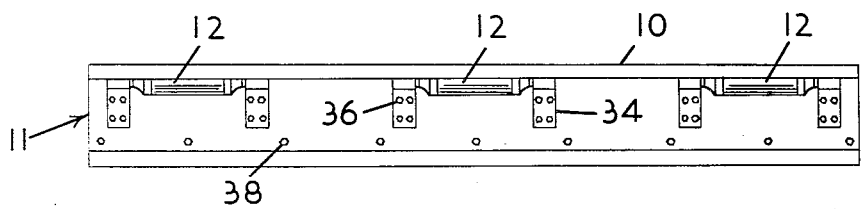
Fig. 2 is a rear elevation view of the scraper frame, moldboard, scraper blade and actuating means therefor for my improved road scraper.

The scraper assembly 8 includes a beam 10, the scraper blade 11 and the blade actuating motors 12 (Fig. 2). The beam 10 is a shallow channel having its forward and rearward edges turned into short, downwardly extending flanges to provide rigidity.

Figure 3:
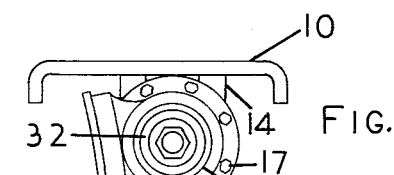
Fig. 3 is an end elevation view of the scraper blade and the actuating unit thereof.
Figure 4:
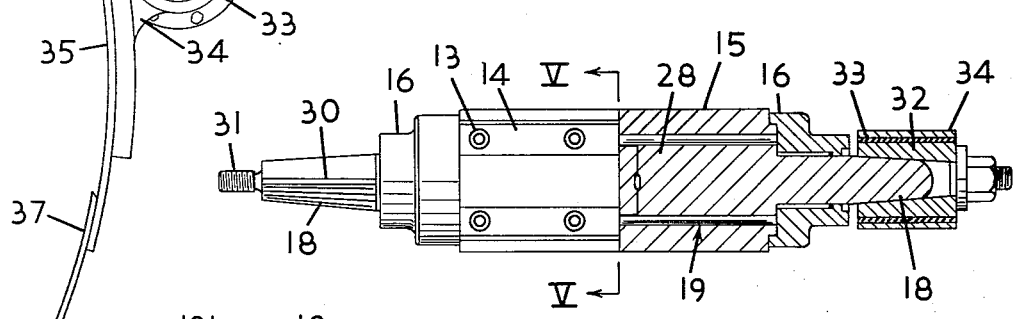
Fig. 4 is a partially sectioned plan view of one of the actuating units for my improved scraper blade.
Figure 5:
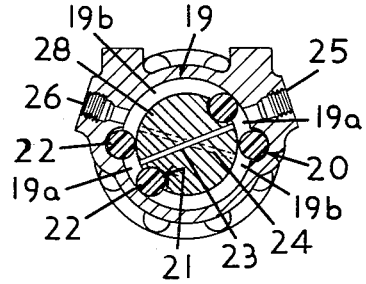
Fig. 5 is a sectional view taken along the plane V—V of Fig. 4.
Figure 6:
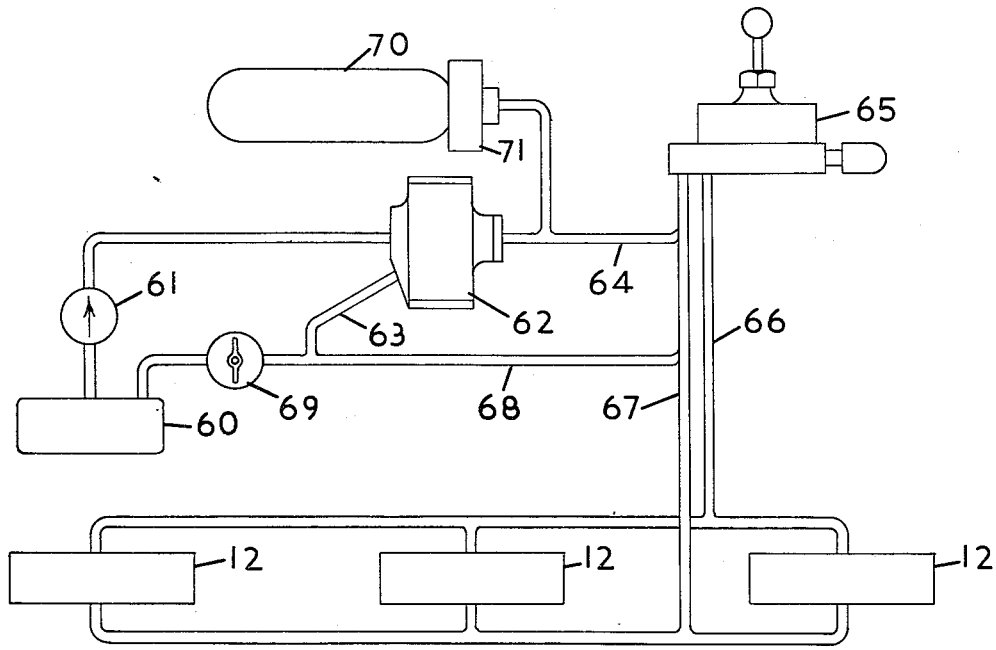
Fig. 6 is a diagrammatic presentation of the hydraulic system for actuating my improved scraper blade.

The three torque motors 12 are mounted to the underside of the beam 10 by means of the bolts extending through the beam into appropriate holes 13 (Fig. 4) in the upstanding bosses 14 (Fig. 3) on the torque motor housing. Thus, each of the torque motors is rigidly affixed to the beam and stationary with respect thereto. Each of the torque motors is identical and consists of a generally tubular housing 15 closed on each end by an annular cap 16. The housing 15 functions as the stator of the motor. The caps are secured to the housing 15 by suitable bolts 17 (Fig. 3). The caps 16 have to be securely anchored to the housing 15 to sustain the high pressures used to operate the torque motor. Rotatably mounted within the housing 15 is a rotor 28 having an axially extending shaft 18 on each end. The diameter of the main portion of the rotor 28 is of lesser diameter than the inside opening of the housing 15 thereby creating an annular chamber 19. The housing is provided with a pair of diametrically spaced, generally semi-circular channels 20 extending the length of the housing and opening into the annular chamber 19. The rotor 28 is provided with a similar pair of diametrically spaced channels 21. Seated in each of the channels 20 and 21 is a compressible rod 22. The diameter of the rods 22 is such that they substantially occupy the channels 20 and 21 and extend across the annular chamber 19 to contact the opposite wall of the annular chamber. The rods divide the annular chamber 19 into four operating chambers these being the pair of operating chambers 19a and the pair of operating chambers 19b. The operating chambers 19a are connected by a diametric passageway 23 through the rotor and the operating chambers 19b are connected by a similar passageway 24 (Fig. 5). Hydraulic fluid passes to and from the operating chambers 19b by means of the fluid port 26. Appropriate seals are provided at each end of the housing to prevent leakage of hydraulic fluid from the operating chambers 19a and 19b.

Further and more detailed description of the torque motor 12 is not beleived necessary since the construction of the motor itself is described in detail and is the subject matter of my copending application entitled Improvement in Hydraulic Torque Motors, Serial Number 342,236, filed March 13, 1953.

The stub shafts 18 each have a tapered section provided with a keyway 30 for seating a key. The end 31 of the stub shafts 18 is threaded. A collar 32 is mounted on the tapered portion of each of the shafts 18 and is secured to the shafts for rotation therewith by means of a key seated in the keyway 30. The collar 32 is urged into tight engagement with the tapered portion of the shaft by means of a nut and washer mounted on the threaded end 31 of the stub shaft. The collar 32 is surrounded by a thick layer of resilient material such as rubber firmly secured to the collar by vulcanization or suitable adhesives. This layer of resilient material forms a flexible coupling 33. The flexible coupling 33 is itself surrounded by the moldboard mounting bracket 34 and is likewise secured to the mounting bracket 34 either by vulcanization or suitable adhesives. The purpose of the flexible coupling will appear more fully under 'Operation.' The bracket 34 has an elongated arcuate plate portion designed to seat against the moldboard 35. The moldboard 35 is held to the bracket 34 by suitable means such as bolts 36. The moldboard is concavely shaped as is conventional for moldboards. The moldboard 35 mounts a scraper blade 37 by suitable means such as bolts 38. The scraper blade 37 has a cutting edge 39 along its upper and lower edges whereby it may be reversed when one of the cutting edges 39 becomes dull.

Although my invention relates solely to the scraper blade assembly for the truck, in providing the means for controlling the scraper blade, the fact that these trucks are also frequently used for snow plowing operations must be considered. The snow plow is mounted ahead of the truck and is controlled by the same hydraulic system used for operating the scraper blade. Although the two units normally are not used simultaneously, they may be alternately used and the control mechanism must make allowance for the operation of both the snow plow and the scraper blade. In the following description of the hydraulic system utilized for operating my invention, it will be first described with no provision made for the snow plow and then described with the system modified to control a snow plow.

The torque motors 12 are operated by hydraulic fluid under a pressure of five hundred to fifteen hundred pounds per square inch gauge. The hydraulic fluid is stored at atmospheric pressure in a reservoir 60 from which it is withdrawn by means of a pump 61 which delivers it to a flow back valve 62. The pump 61 operates under pressure so long as there is sufficient demand for hydraulic fluid at or below the predetermined maximum pressure. When this demand ceases the flow back valve 62 isolates the rest of the hydraulic system from the pump and directs the hydraulic fluid from the pump back to the reservoir via the by-pass line 63. Thus, during periods of no demand, the pump 61 continues to operate but under substantially no pressure because it is merely returning the hydraulic fluid to the reservoir 60 against only the minor resistence created by flowing through the conduits and the back flow valve. Hydraulic fluid is delivered from the flow back valve 62 to the rest of the hydraulic system via the conduit 64. The conduit 64 is connected to a valve 65 which directs the fluid either into the conduit 66 or the conduit 67. The conduits 66 and 67 are both connected to the hydraulic torque motors 12. The conduit 66 connects with the port 25 in the hydraulic torque motor 12 filling the operating chambers 19a. The conduit 67 connects with the port 26 filling the operating chambers 19b. When one of the conduits 66 is connected to the conduit 64 and thereby receiving hydraulic fluid under pressure, the other conduit is opened to the return line 68 whereby the fluid being forced out of the hydraulic torque motors 12 is returned to the reservoir 60. The returning hydraulic fluid is passed through a filter 69 to remove impurities which may be entrained in the liquid.

To provide a source of hydraulic fluid to meet minor demands upon the system, such as occur by reason of leakage or slight shifts in the position of the scraper blade, an accumulator 70 is connected to the conduit 64. The accumulator 70 is equipped with a valve 71 designed to admit hydraulic fluid to the accumulator until the accumulator is loaded to the established maximum pressure of the system. The valve 71 will thereafter permit the fluid to be discharged from the accumulator into the hydraulic system as demanded. The accumulator dampens the peaks and valleys of pressure fluctuations in the system, preventing excessive pressure drops due to sudden demands. When the truck is equipped to operate a scraper without the snow plow only one of the valve mechanisms 65 is used.

Figure 8:
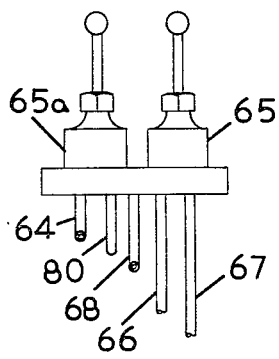
Fig. 8 is an end view of the modified hydraulic system appearing in Fig. 7.
Figure 7:
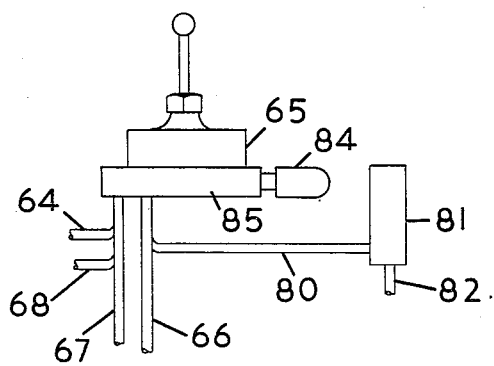
Fig. 7 is a fragmentary view of a modified form of one portion of the hydraulic system appearing in Fig. 6.

When the truck is equipped with a snow plow, a pair of the valve mechanisms 65 are used (Fig. 8), the valve 65 regulating the scraper mechanism and the valve 65a regulating the snow plow. Snow plows, by reason of their construction do not need to be held down in operating position as is the case with the scraper blade. It is, therefore, necessary only to provide means for raising the snow plow into inoperative position. In the case of the scraper blade, hydraulic fluid is necessary to both lower the scraper blade and to maintain it in operating position and to raise the scraper blade and maintain it in inoperative position. The hydraulic fluid for operating both the snow plow and the scraper blade is received from a common source through the conduit 64. When the snow plow is to be raised, the valve 65a is operated to direct fluid from the conduit 64 into the conduit 80 which in turn operates the cylinder 81 to withdraw the piston 82. When the valve 65a is shifted to the other position hydraulic fluid is exhausted from the cylinder 81 through the conduit 80 and is returned to the reservoir 60 through the conduit 68. The weight of the snow plow itself is sufficient to lower the plow and to force the hydraulic fluid out of the cylinder 81. The operation of the valve 65 remains the same whether or not the snow plow valve 65a is utilized.

It is normally necessary to provide a greater pressure for raising the snow plow than to operate the scraper blade. Therefore, there should be a differential between the pressure in the system for operating the hydraulic torque motors 12 and that for operating the cylinder 81. This is accomplished by means of the valve 84 mounted to the base 85 for the control valves 65 and 65a. The hydraulic fluid entering from the conduit 64 is delivered directly to the cylinder 81 through the valve 65a. The hydraulic fluid entering the valve 65, however, first passes through the regulator valve 84. The regulator valve 84 is designed to close when the pressure of the fluid exceeds a predetermined amount. Thus, although the two systems require different pressures, both system may be operated from a common source of hydraulic fluid, eliminating the expensive duplication of pumps, accumulators and back flow valves otherwise necessary. The structure of the control valve forms the subject matter of my copending application entitled Improvement in Control Valves, filed concurrently herewith.

*Operation*

The supporting frame 5 for the scraper blade assembly is mounted to the main frame of the truck and extends beneath this frame at a point between the front and rear wheels. It is sufficiently forward of the rear wheels to permit the blade to swing without interference with the wheels since the length of the blade must be at least equal to the width of the truck and normally somewhat longer. The beam 10, with the scraper assembly mounted thereto, is secured to the mounting frame 5. In my invention the beam 10 constitutes the highest portion of the scraper assembly there being no portion of the scraper assembly extending above the beam. Since the beam is mounted beneath the mounting frame 5, the beam itself is below the frame of the truck and below the running board of the cab portion 3. Thus, the beam 10 with the scraper thereon, may be rotated to any angle with respect to the axis of the truck without interference with the frame or with the running board as has heretofore been the limiting factor on such movements. By the use of the long, generally tubular torque motors 12 which are adapted to lie lengthwise rather than to stand vertically as is essential in the case of the conventional cylinder and reciprocating piston arrangement, the entire operating mechanism may be confined below the beam 10.

Assuming the scraper blade to be in raised or inoperative position, the valve 65 is moved to admit fluid to the torque motors 12 through the conduit 67 and the port 26. Movement of the valve 65 to this position automatically opens the conduit 66 to the return line 68. The hydraulic fluid enters the operating chambers 19b forcing the rods 22 secured to the rotor 28 to separate from the rods 22 secured to the housing 15. The result is rotation of the rotor 28 carrying the scraper blade down with it. Rotation of the rotor causes the operating chambers 19a to contract, forcing the hydraulic fluid therein to return to the reservoir 60. When the scraper blade has been lowered to its operating position the valve 65 is moved to a neutral position preventing further entry or discharge of fluid from the torque motors 12. Due to the uneven resistance of the surface, the blade will be constantly subjected to varying loads, some of which may be great enough to cause it to move slightly backward. Any such movement, however, will be very slight since hydraulic fluid is a liquid and is substantially incompressible.

The flexible coupling 33 provides relief when the scraper blade strikes a fixed object. The flexible coupling 33, being made of rubber or a similar substance, permits the bracket 34 to move with respect to the collar 32 when sufficient force is applied. Thus, the blade may move backward and pass over a fixed object without damage to the blade such as would occur if the blade were rigidly held under the influence of the hydraulic fluid. The relief provided by the flexible coupling 33 also prevents damage to the hydraulic system due to the buildup of excessive pressures.

The valves 65 and 65a are preferably located in the cab of the truck where they are readily accessible to the driver. The rest of the hydraulic system including the accumulator, control valves, pump, reservoir and the necessary conduits are located at any suitable place in the truck. The location of these parts will vary from one truck model to another depending upon the facilities available for them.

The length of the scraper blade and the type of grading it is designed to do will determine the number of torque motors 12 utilized. Where a light duty blade is used for light grading work it may occur that two of the torque motors are sufficient for proper operation. Where, however, the grading blade is to be used for heavy duty work and is itself of heavy construction three, four or even five motor may be desirable to provide the desired amount of torque. The only limitation upon the number of torque motors used is the length of the blade to permit them to be aligned axially underneath the beam 10. All of the moving parts of the torque motor are enclosed and sealed against dirt and corrosive substances. This greatly reduces maintenance costs and provides a more dependable unit.

It will be recognized that various modifications of my invention may be made each without departing from the principle thereof. Each of these modifications is to be considered as included in the hereinafter appended claims unless these claims by their language expressly state otherwise.

I claim:

1. In means for operating a grading blade, the combination comprising: a beam; a torque motor mounted to said beam; said torque motor having a rotor extending therethrough parallel to said beam; said rotor adapted for rotation in either direction; a source of hydraulic fluid under pressure connected to said torque motor; a scraper blade affixed to said rotor and movable therewith, said torque motor being the hinge for said scraper blade.

2. In means for operating a grading blade, the combination comprising: a beam; a torque motor beneath and mounted to said beam; said torque motor having a rotor extending therethrough parallel to said beam; said rotor adapted for rotation in either direction; a source of hydraulic fluid under pressure connected to said torque motor; a resilient coupling mounted on said rotor; a scraper blade affixed to said resilient coupling and movable with said rotor, said torque motor being the hinge for said scraper blade.

3. In means for raising and lowering a grading blade, the combination comprising: a beam; a plurality of torque motors beneath and mounted to said beam; said torque motors each having a rotor extending therethrough parallel to said beam; said rotors adapted for rotation in either direction; a source of hydraulic fluid under pressure common to all of said torque motors; a scraper blade affixed to each of said rotors and movable therewith, said torque motors being the hinge for said scraper blade.

4. In an earth levelling attachment adapted to be mounted to a supporting frame secured beneath the frame of a truck, the combination comprising: a beam pivotally secured at its center to said supporting frame for rotation about a vertical axis in a plane below said truck frame; a plurality of torque motors beneath and mounted to said beam; said torque motors each having a rotor extending therethrough parallel to said beam; said rotors all being aligned on a single axis; said rotors adapted for rotation in either direction; a source of hydraulic fluid under pressure common to all of said torque motors; a scraper blade affixed to each of said rotors.

5. In an earth levelling attachment adapted to be mounted beneath the frame of a truck having a cab said attachment having a beam, a scraper blade and means for mounting said beam to said truck in a plane below said frame and cab for pivotal movement about a vertical axis, the improvement in said attachment comprising: a plurality of torque motors beneath and mounted to said beam; a rotor extending through each of said torque motors; said rotors all being aligned on a single axis parallel to said beam; said rotors adapted for rotation in either direction; a source of hydraulic fluid under pressure common to all of said torque motors; means for attaching said scraper blade to said rotors.

6. In road grading machinery having an elongated beam, a scraper blade and hinge means behind said scraper blade, said hinge means pivotally securing said scraper blade in substantial parallel relationship to said beam, said hinge means being at least one torque motor having a stationary part and a movable part adapted for limited reciprocal rotary movement; one of said parts being secured to said beam and the other to said blade; whereby upon actuation of said torque motor said blade pivots about an axis parallel to said beam.

References Cited in the file of this patent

UNITED STATES PATENTS

| | | |
|---|---|---|
| 1,786,803 | Weeks | Dec. 30, 1930 |
| 1,865,587 | Price | July 5, 1932 |
| 2,187,072 | Le Bleu | Jan. 16, 1940 |
| 2,278,806 | Tilton | Apr. 7, 1942 |